March 4, 1924.
C. C. VAN NUYS
METHOD OF AND APPARATUS FOR PROVIDING BLAST FOR METALLURGICAL
FURNACES AND THE LIKE
Filed Dec. 22, 1920
1,485,745
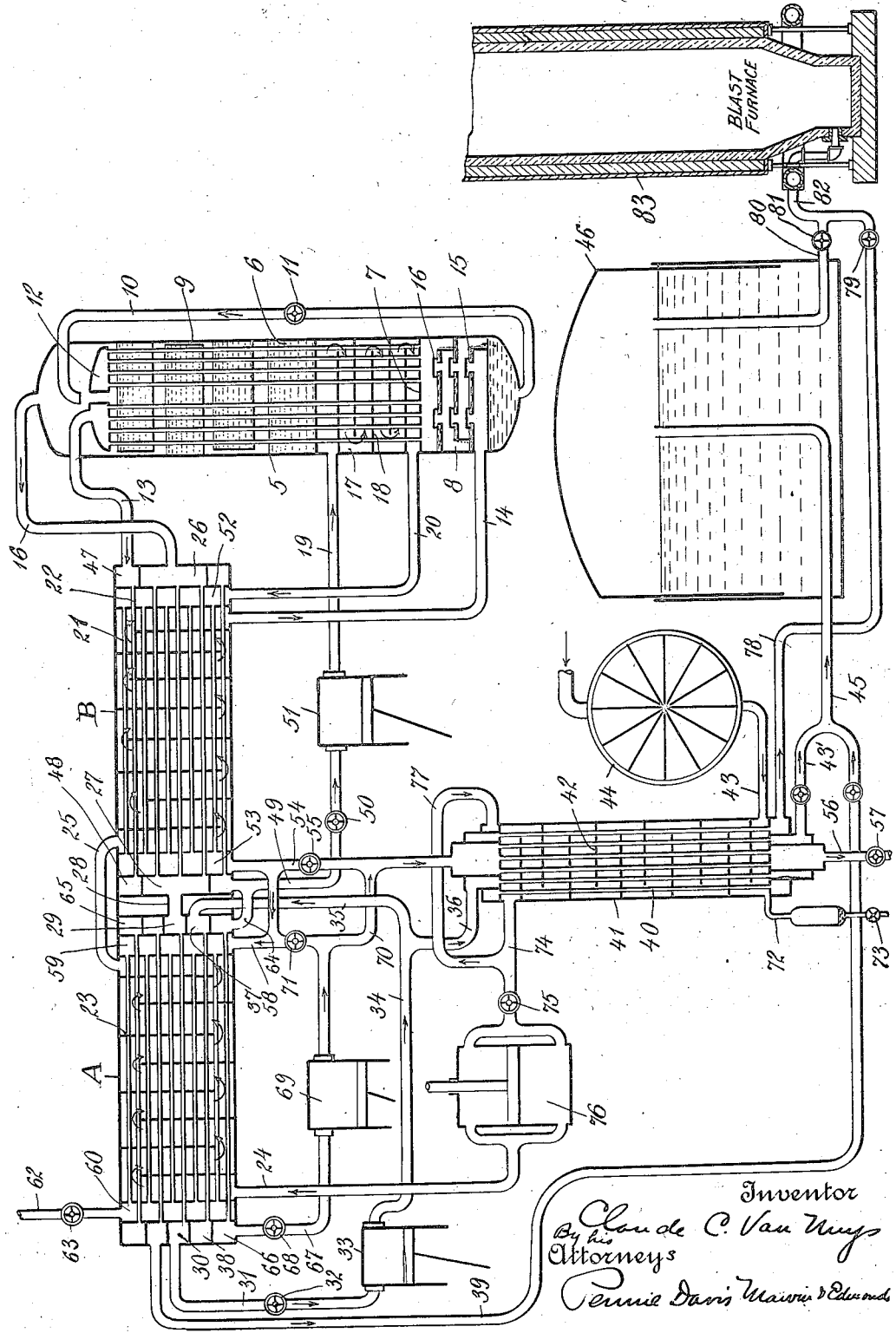
Inventor
Claude C. Van Nuys
By his Attorneys
Pennie Davis Marvin & Edmonds Patented Mar. 4, 1924.

1,485,745

UNITED STATES PATENT OFFICE.

CLAUDE C. VAN NUYS, OF CRANFORD, NEW JERSEY, ASSIGNOR TO AIR REDUCTION COMPANY, INCORPORATED, A CORPORATION OF NEW YORK.

METHOD OF AND APPARATUS FOR PROVIDING BLAST FOR METALLURGICAL FURNACES AND THE LIKE.

Application filed December 22, 1920. Serial No. 432,453.

*To all whom it may concern:*

Be it known that I, CLAUDE C. VAN NUYS, a citizen of the United States, residing at Cranford, in the county of Union, State of New Jersey, have invented certain new and useful Improvements in Methods of and Apparatus for Providing Blast for Metallurgical Furnaces and the like; and I do hereby declare the following to be a full, clear, and exact description of the invention, such as will enable others skilled in the art to which it appertains to make and use the same.

This invention relates to the production of mixtures of oxygen and nitrogen containing a greater proportion of oxygen than atmospheric air for purposes in which such mixtures are capable of beneficial use, and particularly in the operation of metallurgical furnaces and the like to which a blast containing oxygen for combustion purposes is supplied.

The production of an oxygenated blast by liquefaction of air, rectification of the liquid and commingling of the oxygen produced with further quantities of air to supply the mixture of the desired oxygen content to a metallurgical furnace has been heretofore suggested. The benefits to be derived from such procedure have been mathematically calculated and practically demonstrated. Unfortunately however, there are numerous obstacles in the way of actual adoption of the method outlined. In the first place, the rectification of liquid air is a delicate and costly operation, requiring a large expenditure of energy and expensive apparatus. The cost multiplies to a prohibitive degree when we consider an apparatus capable of supplying a sufficient quantity of oxygen to an iron blast furnace. Secondly, there is still the necessity of providing the usual drying plant for the blast if the most effective operation is desired, and the advantage of the oxygen enriched blast does not offset the expense of operating the liquefaction and drying plants. Thus, the entire proposal becomes impractical and offers no effective advance in metallurgical practice.

A primary object of the present invention is the provision of a method of and means for more efficiently producing an enriched mixture of oxygen and nitrogen containing varying proportions of oxygen, in excess of the normal proportion in atmospheric air and up to a theoretical limit as hereinafter explained.

A further object of the invention is the provision of a method of and means for treating air, wherein the entire quantity of air supplied to a metallurgical blast furnace or the like is refrigerated by the excess cold of a liquefaction system and is thereby dried, and a portion of the air is treated to separate and discard a fraction of the nitrogen, thus producing an enriched oxygen mixture which is subsequently added to the dry air blast to produce the desired enrichment of the blast in oxygen.

Another object of the invention is the provision of a method of and means for operating a metallurgical furnace or the like with a dry oxygen enriched mixture in a satisfactory and economical manner so that the known advantages of the enriched blast may be available without prohibitive cost and with resulting improvement in metallurgical practice.

Further objects and advantages of the invention reside in the combinations and arrangements hereinafter described and claimed, as will be more clearly understood by reference to the following specification and accompanying drawing, in which an apparatus adapted for use in the practice of the invention is diagrammatically illustrated, it being understood that no attempt has been made to illustrate details of the apparatus which represent accepted practice in the art, since such details would merely obscure the drawing and would not assist in the illustration of the principle upon which the invention rests.

As above noted, substantially pure oxygen is not produced in carrying out the present invention. The invention depends rather upon the production of a gaseous mixture of limited oxygen enrichment, the limit being fixed and determined by certain physical properties of air and this product is added to air to produce a mixture of more limited enrichment required, for example, for the blast of an iron blast furnace or for other purposes to which the enriched mixture may be applied.

To this end the greatest advantage is taken of the possible enrichment when atmospheric air is liquefied in a condenser employing the principle of "backward return" or passage of the condensed liquid contrawise and in direct contact with the incoming air. Hence the highest oxygen content obtainable in the enriched product will be approximately 45–47%, since this is the composition of a liquid which will have phase equilibrium with a gaseous mixture having the composition of atmospheric air. The method thus makes available, the maximum quantity of gaseous nitrogen delivered at the top of the "backward return" condenser at the original pressure at which the air is delivered to the condenser.

A part of the nitrogen thus rejected is employed to produce the required refrigeration in the liquefaction cycle by expanding it in a suitable engine or turbine after its temperature has been raised to the proper point by indirect contact with the ingoing air. The energy thus recovered is available for compressing further quantities of air, or for other purposes. The remainder of the high pressure nitrogen may, after its temperature has been raised to that of the surrounding atmosphere, be advantageously utilized with or without the addition of external heat in an expansion engine or turbine to assist in driving the air compressor or, as an alternative it may, without the addition of external heat, be employed to assist, after its expansion in an engine or turbine, in refrigerating the unseparated air to which the enriched product is added in producing the blast. The energy derived from any of the expansion engines or turbines may be utilized in compressing further quantities of air.

Since the method employed ensures a product enriched in oxygen to approximately 45%, it follows that the amount of nitrogen rejected is by volume more than one-half the volume of air entering the liquefaction cycle. Hence, the energy available upon expansion of the nitrogen in an engine or turbine, is considerable and only enough additional energy to compress the air going directly to the blast and to make up losses need be supplied. In any blast furnace, the air must be compressed, and, inasmuch as the air and enriched product, when the method is applied to this use, pass directly to the blast furnace at substantially the original pressure, there is no considerable loss of energy through the introduction of the liquefaction cycle.

All of the refrigeration necessary to cool and dry the air required for the blast may be produced by the expansion of the rejected nitrogen. The large expense incident to the maintenance of a refrigeration plant, such as is now widely used to dry the blast, is thus avoided and the drying is accomplished in a very satisfactory and economical manner.

Summarizing the advantages of the invention as applied to metallurgical furnaces; it eliminates the hot blast stoves, because the higher initial temperature produced by the oxygenated blast makes preheating of the blast unnecessary; it provides for refrigerative drying of the blast without additional refrigerating equipment, since sufficient refrigerative effect is available in the liquefaction system; and it produces an oxygenated blast at relatively slight expense, which is fully compensated by the advantages obtained. A higher temperature in the melting zone of the furnace is produced by the blast, and the work of the furnace is accelerated. Incidentally, a considerable volume of nitrogen which otherwise absorbs large quantities of heat in the furnace, is eliminated, and the losses from this source are reduced.

Referring to the accompanying drawing, 5 indicates a tubular condenser having a plurality of tubes 6, terminating at one end in a partition 7, which forms a chamber 8 at the bottom of the condenser in which the liquid formed in the tubes 6 collects. The tubes are surrounded by a plurality of superposed trays 9, adapted to hold a quantity of liquid delivered thereto from the chamber 8, through a pipe 10, having a reducing valve 11. The opposite ends of the tubes 6 terminate in a head 12, from which the residual unliquefied gas is withdrawn through a pipe 13. The gas to be liquefied is delivered to the chamber 8 through a pipe 14, and passes therein through a plurality of trays 15, having the usual caps 16, which permit gas delivered through the pipe 14 to bubble up through the accumulated liquid before entering the tubes 6. The function of the trays 15 is to increase the enrichment of the descending liquid in oxygen by permitting vaporization of nitrogen therefrom, and separation of oxygen from the incoming air. The air ascending the tubes 6 is liquefied by indirect contact with the liquid in the trays 9, which is thereby vaporized, and the vapor, which forms the product enriched in oxygen, is delivered from the top of the condenser to a pipe 16.

Intermediate the partition 7 and the trays 9, a chamber 17 is preferably arranged in which a plurality of baffles 18 are disposed to permit the passage of a cold, gaseous product delivered through a pipe 19 and leaving the chamber by a pipe 20. The cold, gaseous product results from the expansion of the separated gaseous mixture as hereinafter explained, and serves to maintain the necessary low temperature in the condenser by cooling the ascending air in the tubes 6, before it passes in indirect contact with the liquid in the trays 9. As the volume of gas passing through the chamber 17 may be readily regulated, this arrangement permits the necessary control of the temperature conditions, and ensures operation at maximum efficiency. In the normal operation, the vaporized product, delivered through the pipe 16, is a mixture of nitrogen with upward to 45 to 47% oxygen, and is adapted, as hereinafter explained, to be mixed with the main body of the blast to produce an enriched mixture of the desired composition. The gas escaping from the pipe 13 is substantially pure nitrogen and may be employed for any desired purpose after it has been expanded to recover energy therefrom.

In order to maintain the desired operation, it is necessary to provide for the transfer of the cold of the outgoing gases to the incoming air, and for this purpose an exchanger, preferably having two compartments A and B, is provided. Each compartment contains two sets of tubes 21 and 22, and a plurality of baffles 23 arranged to cause air entering through a pipe 24 to circulate about the tubes. A pipe 25 connects the sections A and B of the exchanger, and the cooled air is finally delivered to the pipe 14.

The effluent mixture escaping from the condenser through the pipe 16 is delivered to a chamber 26 at one end of the exchanger and passes thence through a number of the tubes 22 to a chamber 27 at the opposite end of the section B. Thence the gas passes through a pipe 28 to a chamber 29 communicating with a number of the tubes 22 in the section A, which deliver the gas to a chamber 30, and thence through a pipe 31 controlled by a valve 32 to expansion engine 33. Here the effluent mixture is expanded and thereby cooled, and the expanded product is delivered through a pipe 34, which is provided with two branches 35 and 36. The branch 35 communicates with an annular chamber 37 at one end of the section A of the exchanger, which delivers the expanded product through a number of the tubes 22 to an annular chamber 38 at the opposite end of the section A, whence it escapes through a pipe 39. The balance of the expanded product is delivered from the branch 36 to tubes 40 and an exchanger 41 having a plurality of baffles 42 to cause circulation of air entering through a pipe 43 from a blower 44 about the tubes 40. The air is thus cooled while the expanded product is warmed and the latter escapes through a pipe 43' and joins the expanded product from the pipe 39. A pipe 45 delivers the expanded product to a gasometer 46 which serves to maintain the pressure of the gas.

Nitrogen escaping from the condenser through the pipe 13 is delivered to an annular chamber 47 at the end of the section B, and passes thence through a number of the tubes 22 to an annular chamber 48, from which a portion of the nitrogen is withdrawn through a pipe 49 controlled by a valve 50, and delivered to an expansion engine 51, where it is expanded and thereby cooled. The cold nitrogen is delivered by the pipe 19 to the chamber 17 of the condenser, and, after circulating about the baffles 18, it escapes through the pipe 20 to a chamber 52 at the end of the section B. Thence the nitrogen passes through tubes 21 to a chamber 53 at the opposite end of the section B and a portion thereof is withdrawn and delivered through a pipe 54, controlled by a valve 55 to the tubes 40 and exchanger 41, and escapes through a pipe 56 controlled by a valve 57. The remainder of the nitrogen is delivered by a pipe 58 to a chamber 59 at one end of the section A, and passes thence through tubes 21 to a chamber 60 at the opposite end of the section A. A pipe 62 controlled by a valve 63 permits escape of the nitrogen.

The remainder of the nitrogen from the chamber 48 is delivered by a pipe 64 to a chamber 65 at one end of the section A, whence the gas passes through a number of the tubes 22 to an annular chamber 66 at the opposite end of the section A. A pipe 67, controlled by a valve 68, delivers the nitrogen to an expansion engine 69, where it is expanded and cooled, a portion being delivered through a branch 70 and pipe 54 to the tubes 40 of the exchanger 41, while the remainder is permitted to escape under control of a valve 71 and pipe 58 to the chamber 59, and thence to the outlet pipe 62 as hereinbefore described.

Preferably, the entire volume of air required by the blast furnace, assuming that the product is to be used for the purpose, is raised to the desired pressure of the blast by the blower 44, and is delivered to the exchanger 41, where it is cooled by indirect contact with the cold gases passing through the tubes 40, and the moisture content is thereby removed, the moisture being withdrawn through a purge 72 controlled by a valve 73. The cooled and dry air then escapes through a pipe 74, and a portion thereof, controlled by a valve 75, is further compressed in a compressor 76, and delivered to the pipe 24, which conveys it to the section A of the exchanger. This is the portion of the blast which is subjected to a selective liquefaction in the condenser to produce a mixture enriched in oxygen, and the separate constituents of the air entering the condenser have been traced in the preceding description. The balance of the air is delivered by a pipe 77 to a number of the tubes 40 of the exchanger 41, and, after giving up its cold to the incoming air, is delivered through a pipe 78 controlled by a valve 79. A pipe 80, controlled by valve 81, delivers the required proportion of the mixture enriched in oxygen from the gasometer 46, to the cooled and dry air in the pipe 78, and the new mixture, containing a materially reduced proportion of oxygen, but still in excess of the normal air, is delivered through a pipe 82 to the blast furnace 83 or to some other point of utilization of the product.

From the foregoing, it will be noted that the apparatus is extremely simple in character and operation, and particularly that no rectification of the liquid is attempted, thus saving materially in the cost and operation, and permitting such operation without any of the difficulties and annoyances which are to be expected in the operation of rectification apparatus. All of the air entering the condenser passes therethrough at the initial pressure, except such portion as is liquefied, and the pressure on the liquid is only dropped sufficiently to permit vaporization of the liquid in the trays by the incoming air in the vaporizer tubes. The entire amount of nitrogen delivered, which is in the neighborhood of 50% by volume of the air treated, is released from the vaporizer at the initial pressure, and consequently, when warmed, this nitrogen is available for expansion and recovery of the energy, which may be utilized in compressing further quantities of air.

The product enriched in oxygen escapes at sufficient pressure to permit expansion for the recovery of energy. In relatively large installations suitable for blast furnace work, it may be desirable, however, to omit the expansion of the enriched product, all of the required refrigeration being available through expansion of the nitrogen. The enriched mixture is of a composition which may be added to the remaining volume of the blast air to enrich the final mixture to the desired extent, which will be preferably in the neighborhood of two to five per cent when the blast is applied to an iron blast furnace. The entire volume of the blast is refrigerated by the cold which is readily developed in the system, and moisture is thus separated with the advantage familiar to metallurgists and others skilled in the art. The customary refrigerating plant for drying the air is entirely eliminated.

Owing to the increased rate of combustion which results from the use of oxygen in the blast, it is unnecessary to provide hot blast stoves in connection with the blast furnace, and the operation is thus further simplified. It is therefore possible to obtain metallurgical advantages of a blast enriched with oxygen, without materially increasing the cost of operation of the blast furnace, a result of incalculable benefit to the iron and steel industry.

It is to be observed that while the invention is primarily devoted to the production of the oxygenated blast for metallurgical furnaces and the like, the oxygenated mixture may be applied to various other uses, which are within the scope of the invention.

Various changes may be made in the details of operation, and particularly in the type and character of the apparatus employed without departing from the invention or sacrificing any of its numerous advantages.

I claim:

1. A method of producing an oxygenated blast, which comprises compressing atmospheric air, subjecting a portion of the compressed air to further compression and to a liquefaction operation to separate nitrogen therefrom, discarding the nitrogen and mixing the oxygen enriched product with the remainder of the compressed air.

2. A method of producing an oxygenated blast, which comprises compressing atmospheric air, subjecting a portion of the compressed air to further compression and a selective liquefaction operation by indirect contact with liquid produced in the operation, thereby producing a liquid product enriched in oxygen, evaporating the liquid, discarding the separated nitrogen and mixing the evaporation product with the remainder of the compressed air.

3. A method of producing an oxygenated blast, which comprises compressing atmospheric air, subjecting a portion of the compressed air to further compression and selective liquefaction to separate residual nitrogen and a liquid enriched in oxygen, discarding the nitrogen, evaporating the liquid and mixing the evaporation product with the remainder of the compressed air.

4. A method of producing an oxygenated blast, which comprises compressing atmospheric air, subjecting a portion of the compressed air to further compression and a liquefaction operation including indirect contact of the compressed air with a liquid product of the operation, and backward return of the liquid formed in contact with succeeding portions of the air to be liquefied, thereby separating the air into residual nitrogen and a liquid product enriched in oxygen, discarding the nitrogen, evaporating the liquid and mixing the evaporation product with the remainder of the compressed air.

5. A method of producing an oxygenated blast, which comprises compressing the volume of atmospheric air required for the blast, subjecting a portion of the compressed air to further compression, and a liquefaction operation to separate nitrogen therefrom, discarding the nitrogen, mixing the product enriched in oxygen with the remainder of the blast and delivering the mixture at the desired pressure of the blast.

6. A method of producing an oxygenated blast, which comprises compressing atmospheric air, subjecting a portion thereof to a liquefaction operation to separate nitrogen therefrom, withdrawing and expanding the nitrogen to recover energy therefrom, utilizing the cold expanded nitrogen to maintain the low temperature required, and mixing the product enriched in oxygen with the remainder of the compressed air.

7. A method of producing an oxygenated blast, which comprises compressing atmospheric air, subjecting a portion thereof to a liquefaction operation to separate nitrogen therefrom, withdrawing and expanding the nitrogen to recover energy therefrom, utilizing the cold expanded nitrogen to maintain the low temperature required, mixing the product enriched in oxygen with the remainder of the compressed air, and utilizing the energy recovered in compressing further quantities of air.

8. A method of producing an oxygenated blast, which comprises compressing atmospheric air, subjecting a portion thereof to further compression and a liquefaction operation to separate nitrogen therefrom, and a liquid enriched in oxygen, evaporating the liquid, partially expanding the evaporation product to recover energy therefrom, utilizing the cold expanded product to maintain the low temperature required and mixing the expanded product with the remainder of the compressed air.

9. A method of producing an oxygenated blast, which comprises compressing atmospheric air, subjecting a portion thereof to further compression and a liquefaction operation to separate nitrogen therefrom, and a liquid enriched in oxygen, evaporating the liquid, partially expanding the evaporation product to recover energy therefrom, utilizing the cold expanded product to maintain the low temperature required, mixing the expanded product with the remainder of the compressed air and utilizing the energy recovered in compressing further quantities of air.

10. A method of producing a substantially dry oxygenated blast, which comprises compressing atmospheric air, subjecting a portion of the compressed air to a liquefaction operation to separate nitrogen therefrom, discarding the nitrogen, utilizing surplus cold of the liquefaction operation to refrigerate all of the compressed air, thereby separating moisture therefrom and mixing the oxygen enriched product of the liquefaction operation with the unliquefied air.

11. A method of producing a substantially dry oxygenated blast, which comprises compressing atmospheric air, subjecting a portion of the compressed air to further compression and liquefaction to separate nitrogen therefrom, expanding the nitrogen and the remaining enriched oxygen product to recover energy therefrom, utilizing a portion of the cold developed by the expansion to refrigerate all of the compressed air and thereby separate moisture therefrom and mixing the oxygen enriched product with the remainder of the compressed air.

12. A method of producing a substantially dry oxygenated blast, which comprises compressing atmospheric air, subjecting a portion of the compressed air to further compression and liquefaction to separate nitrogen therefrom, expanding the nitrogen and the remaining enriched oxygen product to recover energy therefrom, utilizing a portion of the cold developed by the expansion to refrigerate all of the compressed air and thereby separate moisture therefrom, mixing the oxygen enriched product with the remainder of the compressed air and utilizing the energy recovered to compress further quantities of air.

13. A method of producing a substantially dry oxygenated blast, which comprises compressing atmospheric air, subjecting a portion thereof to a liquefaction operation to separate nitrogen therefrom, expanding the nitrogen to recover energy therefrom, utilizing a portion of the cold developed by the expansion to refrigerate all of the compressed air and thereby separate moisture therefrom and mixing the oxygen enriched product of the liquefaction operation with the remainder of the compressed air.

14. A method of producing a substantially dry oxygenated blast, which comprises compressing atmospheric air, subjecting a portion thereof to a liquefaction operation to separate nitrogen therefrom, expanding the nitrogen to recover energy therefrom, utilizing a portion of the cold developed by the expansion to refrigerate all of the compressed air and thereby separate moisture therefrom, mixing the oxygen enriched product of the liquefaction operation with the remainder of the compressed air and utilizing the energy recovered to compress further quantities of air.

15. A method of operating metallurgical blast furnaces and the like, which comprises compressing atmospheric air for the blast, further compressing and subjecting a portion of the compressed air to a selective liquefaction operation to separate a product enriched in oxygen, mixing the enriched product with the remainder of the air and introducing the blast to the furnace at substantially the pressure attained in the original compression.

16. A method of operating metallurgical blast furnaces and the like, which comprises compressing atmospheric air for the blast, subjecting a portion of the compressed air to a liquefaction operation to separate a product enriched in oxygen, utilizing surplus cold developed in the liquefaction operation to refrigerate the compressed air and thereby separate moisture therefrom and mixing the oxygen enriched product with the remainder of the moisture free compressed air, and introducing the blast to the furnace at substantially the pressure attained in the original compression.

17. A method of operating metallurgical furnaces and the like, which comprises compressing atmospheric air to the pressure required for the blast, further compressing and separating nitrogen from a portion of the compressed air, to provide a mixture enriched in oxygen, combining the enriched mixture with the remainder of the compressed air and delivering the product to the furnace.

18. A method of operating metallurgical furnaces and the like, which comprises compressing atmospheric air to provide the blast, separating nitrogen from a portion of the compressed air to provide a mixture containing not exceeding 47% of oxygen, combining the enriched mixture with the remainder of the compressed air and delivering the product to the furnace.

19. A method of operating metallurgical furnaces and the like, which comprises compressing atmospheric air to provide the blast, separating nitrogen from a portion of the compressed air to provide a mixture enriched in oxygen, expanding the nitrogen to recover energy, utilizing the cold expanded nitrogen to refrigerate the compressed air and thereby separate moisture therefrom, combining the enriched mixture with the remainder of the moisture free air and delivering the product to the furnace.

20. A method of providing an oxygenated blast for metallurgical furnaces and the like, which comprises separating a portion of the nitrogen of air by a liquefaction operation, rejecting the nitrogen, recovering the remaining constituents in the form of a mixture of oxygen and nitrogen containing oxygen in a greater proportion than the normal composition of air and at least 50 per cent. of nitrogen and adding said mixture to the balance of the air necessary for the blast.

21. A method of providing an oxygenated blast for metallurgical furnaces and the like, which comprises separating a portion of the nitrogen of air by a liquefaction operation, rejecting the nitrogen, recovering the remaining constituents in the form of a mixture of oxygen and nitrogen containing oxygen in a greater proportion than the normal composition of air, utilizing cold developed by the liquefaction operation to refrigerate the balance of the air necessary for the blast, and thereby separating moisture therefrom, and adding said mixture to the moisture free air.

22. A method of providing an oxygenated blast for metallurgical furnaces and the like, which comprises separating a portion of the nitrogen of air by a liquefaction operation, rejecting the nitrogen, recovering the remaining constituents in the form of a mixture of oxygen and nitrogen containing not more than 47% of oxygen and adding said mixture to the balance of the air necessary for the blast.

23. A method of providing an oxygenated blast for metallurgical furnaces and the like, which comprises producing by a liquefaction operation a mixture of oxygen and nitrogen containing oxygen in greater proportion than in atmospheric air, but not exceeding 47% of the mixture and adding the mixture to the balance of the air necessary for the blast.

24. A method of providing an oxygenated blast for metallurgical furnaces and the like, which comprises producing by a liquefaction operation a mixture of oxygen and nitrogen containing oxygen in greater proportion than in atmospheric air, but not exceeding 47% of the mixture, utilizing cold developed by the liquefaction operation to refrigerate the balance of the air necessary for the blast and thereby separate moisture therefrom, and adding the mixture to the moisture free air.

25. An apparatus for producing an oxygenated blast, including an air compressor, means for further compressing and separating a portion of the air compressed into a product enriched in oxygen and a residual gas, and means for mixing the enriched product with the remainder of the air.

26. An apparatus for producing an oxygenated blast, including an air compressor, means for separating a portion of the air compressed into a product enriched in oxygen and a residual gas, means for refrigerating the compressed air to separate moisture therefrom by cold developed in separating a portion of the air and means for mixing the enriched product with the remainder of the compressed air.

27. In an apparatus of the character described, the combination with a blast or similar metallurgical furnace, of means for compressing the blast, means for further compressing and separating nitrogen by a liquefaction operation from a portion of the air required for the blast to provide a mixture enriched in oxygen, and means for adding the mixture to the balance of the air required for the blast.

28. In an apparatus of the character described, the combination with a blast or similar metallurgical furnace, of means for separating nitrogen by a liquefaction operation from a portion of the air required for the blast to provide a mixture enriched in oxygen, means for adding the mixture to the balance of the air required for the blast, and means for recovering energy from the separated nitrogen.

29. In an apparatus of the character described, the combination with a blast or similar metallurgical furnace, of means for compressing the air required for the blast, means for further compressing and separating nitrogen by a liquefaction operation from a portion of the air to provide a mixture enriched in oxygen and means for adding the mixture to the balance of the air.

30. In an apparatus of the character described, the combination of a blast or similar metallurgical furnace, means for compressing air for the blast delivered thereto, and means interposed between the compressing means and furnace and adapted to separate and reject nitrogen from a portion of the air, thereby producing a mixture enriched in oxygen and to add the mixture to the balance of the air.

31. In an apparatus of the character described, the combination of a blast or similar metallurgical furnace, means for compressing air for the blast delivered thereto, liquefying means interposed between the compressing means and furnace, and adapted to separate and reject nitrogen from a portion of the air, thereby producing a mixture enriched in oxygen and means for adding the mixture to the balance of the air.

32. In an apparatus of the character described, the combination of a blast or similar metallurgical furnace means for compressing air for the blast delivered thereto, liquefying means interposed between the compressing means and furnace, and adapted to separate and reject nitrogen from a portion of the air, thereby producing an enriched mixture, means for utilizing cold developed in the liquefaction to refrigerate the air, thereby removing moisture therefrom, and means for adding the enriched mixture to the balance of the air.

In testimony whereof I affix my signature.

CLAUDE C. VAN NUYS.